(12) United States Patent
Wang et al.

(10) Patent No.: US 12,306,439 B2
(45) Date of Patent: May 20, 2025

(54) OPTICAL WAVEGUIDE MULTI-CASCADED COUPLING MODE DIVISION MULTIPLEXER

(71) Applicant: Shanghai University, Shanghai (CN)

(72) Inventors: Tingyun Wang, Shanghai (CN); Chuanlu Deng, Shanghai (CN); Yi Huang, Shanghai (CN); Xiaobei Zhang, Shanghai (CN)

(73) Assignee: Shanghai University (CN)

( * ) Notice: Subject to any disclaimer, the term of this patent is extended or adjusted under 35 U.S.C. 154(b) by 233 days.

(21) Appl. No.: 18/114,824

(22) Filed: Feb. 27, 2023

(65) Prior Publication Data

US 2023/0280535 A1 Sep. 7, 2023

(30) Foreign Application Priority Data

Mar. 3, 2022 (CN) .......................... 202210210877.8

(51) Int. Cl.
| | |
|---|---|
| *G02B 6/12* | (2006.01) |
| *G02B 6/122* | (2006.01) |
| *G02B 6/125* | (2006.01) |
| *G02B 6/14* | (2006.01) |

(Continued)

(52) U.S. Cl.
CPC .............. *G02B 6/125* (2013.01); *G02B 6/12* (2013.01); *G02B 6/122* (2013.01); *G02B 6/14* (2013.01); *G02B 6/26* (2013.01); *G02B 6/272* (2013.01); *G02B 6/2773* (2013.01); *G02B 2006/12164* (2013.01)

(58) Field of Classification Search
CPC .......... G02B 6/12; G02B 6/122; G02B 6/125; G02B 6/14; G02B 6/26; G02B 6/272; G02B 6/2773; G02B 2006/12164
See application file for complete search history.

(56) References Cited

U.S. PATENT DOCUMENTS

| | | | | |
|---|---|---|---|---|
| 8,213,754 B2 * | 7/2012 | Png | .......................... | G02B 6/125 385/132 |
| 8,363,987 B2 * | 1/2013 | Bagheri | ................. | G02B 6/125 385/3 |

(Continued)

FOREIGN PATENT DOCUMENTS

JP 2017134222 A * 8/2017

*Primary Examiner* — Ryan A Lepisto
(74) *Attorney, Agent, or Firm* — Dickinson Wright PLLC

(57) ABSTRACT

Disclosed is an optical waveguide multi-cascaded coupling mode division multiplexer. The optical waveguide multi-cascaded coupling mode division multiplexer comprises an optical waveguide layer and a substrate layer, wherein the optical waveguide layer comprises a first optical waveguide and a second optical waveguide; the second optical waveguide comprises a transmission optical waveguide and a plurality of coupling structures; each coupling structure comprises a coupling optical waveguide and a connecting optical waveguide; the coupling optical waveguide and the transmission optical waveguide are connected through the connecting optical waveguide; the coupling optical waveguide is parallel to the transmission optical waveguide; and the distance between the coupling optical waveguide and the first optical waveguide is smaller than that between the transmission optical waveguide and the first optical waveguide.

16 Claims, 7 Drawing Sheets

(51) Int. Cl.
*G02B 6/26* (2006.01)
*G02B 6/27* (2006.01)

(56) References Cited

U.S. PATENT DOCUMENTS 10,353,148 B2 * 7/2019 Zhao ................ H04B 10/2581
2023/0273368 A1 * 8/2023 Katsuyama ........ G02B 6/12007
　　　　　　　　　　　　　　　　　　　　385/28

* cited by examiner

OPTICAL WAVEGUIDE MULTI-CASCADED COUPLING MODE DIVISION MULTIPLEXER

CROSS-REFERENCE TO RELATED APPLICATION

This patent application claims the benefit and priority of Chinese Patent Application No. 202210210877.8, filed with the China National Intellectual Property Administration on Mar. 3, 2022, the disclosure of which is incorporated by reference herein in its entirety as part of the present application.

TECHNICAL FIELD

The present disclosure relates to the technical field of optical waveguide plate interconnection, in particular to an optical waveguide multi-cascaded coupling mode division multiplexer.

BACKGROUND

In recent years, the requirement on data processing is higher and higher in data center, supercomputer and other fields. The increase of data transmission bandwidth and the high speed data processing urgently need to be solved. Back plate optical interconnection technology has become a research hotspot in the field of optical communication in recent years by means of the advantages of large bandwidth, low power consumption and strong anti-electromagnetic interference ability.

In the numerous key technologies of optical interconnection systems, the mode division multiplexing technology is a multiplexing technology capable of further improving the information transmission capacity besides wavelength division multiplexing and polarization multiplexing technologies, and different modes are used for carrying multiple signals. The preparation of optical waveguide devices by using polymer materials is a research hotspot of integrated optical circuits in recent years. The optical waveguide mode division multiplexer can convert the fundamental mode in the single-mode waveguide to the higher-order mode in the few-mode waveguide, mode multiplexing is realized, and the transmission capacity of the system is improved, so the optical waveguide device becomes an important device in the mode division multiplexing system and has been widely researched.

The mode coupling theory, as an important theoretical support of the mode division multiplexer, refers to the transfer of optical wave power between the modes of different optical waveguides or between different modes of the same optical waveguide when the coupling conditions are met. At present, there are a lot of research contents about mode division multiplexers. The literature "Research on Asymmetric Directional Coupler of Polymer Optical Waveguide Applied to Mode Division Multiplexing" analyzes the mode coupling conditions of asymmetric directional coupling technology, the factors affecting the coupling efficiency and coupling length of optical waveguide, and introduces the preparation technology of optical waveguide. The literature "Research on Optical Waveguide Three-mode Mode Division Multiplexer" researches asymmetric directional coupling, and makes a simulation analysis on the influence of optical waveguide interval on mode division multiplexing. The literature points out that the mode coupling efficiency is firstly increased and then decreased along with the increase of optical waveguide interval, but the coupling length is increased all the time, and the speed increase is accelerated. For optical waveguides which can be coupled, the optical waveguide interval capable of theoretically obtaining the maximum coupling efficiency is generally small, but too small optical waveguide interval can cause the increase of the difficulty of the optical waveguide preparation process. There are many uncontrollable factors in the process of optical waveguide preparation, such as exposure and development, resulting in big errors between the actually prepared optical waveguide and the theoretical design, so that the large-scale mass production is difficult.

At present, the directional coupled mode division multiplexer is composed of a main optical waveguide and an auxiliary optical waveguide, and the main optical waveguide and the auxiliary optical waveguide are both straight waveguides. The interval between the main optical waveguide and the auxiliary optical waveguide is large. The power of the main optical waveguide is coupled into the auxiliary optical waveguide, and the optical waveguides are propagated and finally output, so that the coupling efficiency is low. The above-mentioned research shows that the closer the distance between the optical waveguides is in theory, the higher the coupling power is, and the higher the coupling efficiency is. However, too small interval between the optical waveguides can cause the increase of the difficulty of the optical waveguide preparation process. There are many uncontrollable factors in the process of optical waveguide preparation, such as exposure and development, resulting in big errors between the actually prepared optical waveguide and the theoretical design, so the process is difficult to realize.

In conclusion, it shows that how to improve the coupling efficiency under the condition that the optical waveguide interval is large and kept unchanged is a problem to be solved at present.

SUMMARY

The purpose of the present disclosure is to provide an optical waveguide multi-cascaded coupling mode division multiplexer to solve the problem of improving the coupling efficiency under the condition that the interval between the optical waveguides is unchanged.

In order to solve the above-mentioned technical problem, the present disclosure provides an optical waveguide multi-cascaded coupling mode division multiplexer, comprising an optical waveguide layer, wherein the optical waveguide layer comprises a first optical waveguide and a second optical waveguide;

the second optical waveguide comprises a transmission optical waveguide and a plurality of coupling structures;

each coupling structure comprises a coupling optical waveguide and a connecting optical waveguide;

the coupling optical waveguide and the transmission optical waveguide are connected through the connecting optical waveguide;

the coupling optical waveguide is parallel to the transmission optical waveguide;

the distance between the coupling optical waveguide and the first optical waveguide is smaller than that between the transmission optical waveguide and the first optical waveguide; and when optical waves are propagated in the first optical waveguide, the coupling structures in the second waveguide are used for sequentially coupling the mode power of the first optical waveguide, the sequentially coupled mode power is superposed, and the coupled and superposed power is output at the output end.

Preferably, the connecting optical waveguide is an S-shaped bent optical waveguide.

Preferably, the heights of the first optical waveguide and the second optical waveguide are equal, and the widths of the first optical waveguide and the second optical waveguide are adjusted to ensure that the effective refractive index of the high-order mode in the first optical waveguide is equal to that of the fundamental mode in the second optical waveguide.

Preferably, the coupling structures comprise three coupling structures.

Preferably, the lengths of the coupling optical waveguides in the coupling structures are obtained so that the power of the two superimposed optical waves is equal, and the phases of the modes in the waveguides of any two superimposed coupling structures are equal at the superposition position, that is, the phase difference is 0, so that the maximum power of the optical waves after coupling and superposition is ensured.

Preferably, the distance between the transmission optical waveguide and the first optical waveguide is larger than the maximum effective coupling distance.

Preferably, the distance between the coupling optical waveguide and the first optical waveguide is 4 μm.

Preferably, the optical waveguide multi-cascaded coupling mode division multiplexer further comprises a substrate layer, and the substrate layer is taken as a substrate for placing and fixing the first optical waveguide and the second optical waveguide.

Preferably, the optical waveguide layer is made of polymer photoresist, and the substrate layer is made of an FR-4 epoxy plate.

Preferably, an optical waveguide communication system comprises the optical waveguide multi-cascaded coupling mode division multiplexer.

The optical waveguide multi-cascaded coupling mode division multiplexer provided by the present disclosure comprises a first optical waveguide and a second optical waveguide. The second optical waveguide comprises a transmission optical waveguide and a plurality of coupling structures. Each coupling structure comprises a coupling optical waveguide and a connecting optical waveguide. Under the condition that the interval between the optical waveguides is unchanged, the straight waveguides in the coupling structures are used for coupling, and the power obtained by coupling is transmitted to the transmission optical waveguide by the connecting waveguide for superposition. After the optical waves pass through the coupling structures, coupling is carried out for multiple times, and the power obtained by coupling is sequentially superimposed and output, so that the coupling efficiency is greatly improved. Under the condition that the interval between optical waveguides, the power obtained by coupling is superimposed only by adding the coupling structures, so that the coupling efficiency is improved.

BRIEF DESCRIPTION OF THE DRAWINGS

To describe the technical solutions in the embodiments of the present disclosure or in the prior art more clearly, the following briefly describes the attached figures required for describing the embodiments or the prior art. Apparently, the attached figures in the following description show merely some embodiments of the present disclosure, and a person of ordinary skill in the art may derive other drawings from these attached figures without creative efforts.

DETAILED DESCRIPTION OF THE EMBODIMENTS

The core of the present disclosure is to provide an optical waveguide multi-cascaded coupling mode division multiplexer. The coupling efficiency among optical waveguide modes is improved by repeatedly coupling multiple coupling structures and superposing the mode power obtained by coupling.

For the purpose that those skilled in the art understand the technical solution of the present disclosure better, the following further illustrates the present disclosure with the reference to the attached figures and specific embodiments. Apparently, the embodiments in the following description are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

The directional coupled multi-cascaded mode division multiplexer provided by the present disclosure comprises an optical waveguide layer and a substrate layer. The optical waveguide layer comprises a first optical waveguide and a second optical waveguide. The second optical waveguide comprises a transmission optical waveguide and a plurality of coupling structures. Each coupling structure comprises a coupling optical waveguide and a connecting optical waveguide. The coupling optical waveguide and the transmission optical waveguide are connected through the connecting optical waveguide. The coupling optical waveguide is parallel to the transmission optical waveguide. The distance between the coupling optical waveguide and the first optical waveguide is smaller than that between the transmission optical waveguide and the first optical waveguide.

Figure 1:
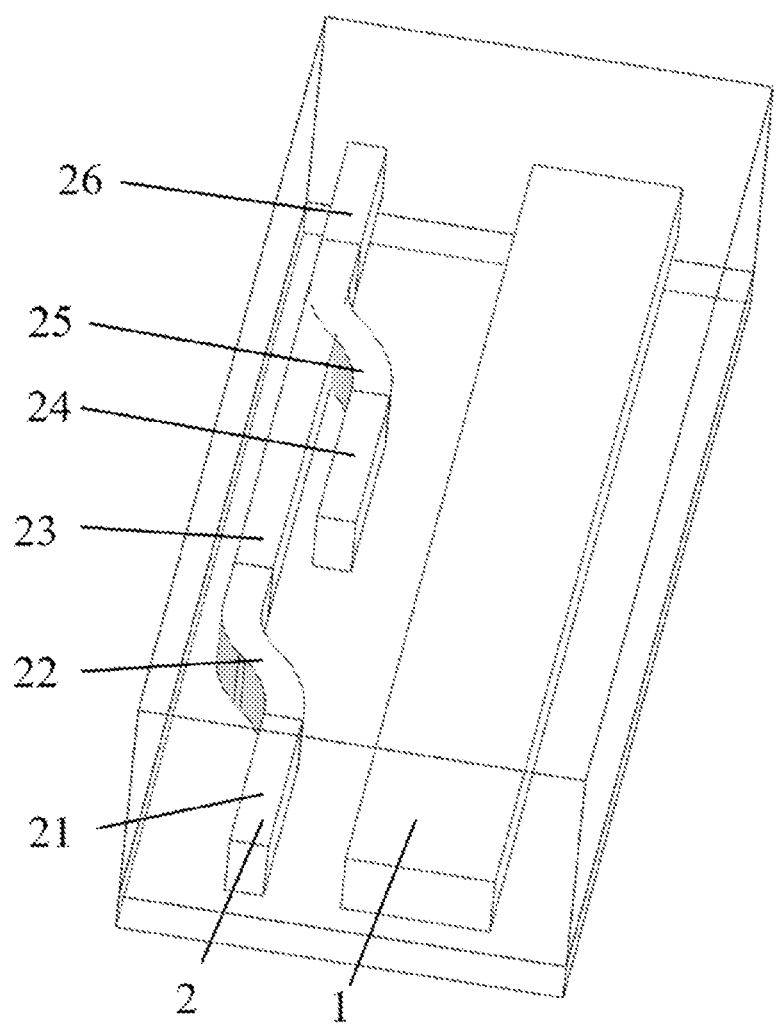
FIG. 1 is a structural model diagram of a directional coupled multi-cascaded mode division multiplexer.

Referring to FIG. 1, FIG. 1 is a structural model diagram of a directional coupled two-stage coupling mode division multiplexer. The specific details are as follows.

The first optical waveguide 1 is parallel to the second optical waveguide 2. The second optical waveguide 2 comprises a first coupling optical waveguide 21, a first S-shaped bent optical waveguide 22, a first transmission optical waveguide 23, a second coupling optical waveguide 24, a second S-shaped bent optical waveguide 25 and a second transmission optical waveguide 26. The first coupling optical waveguide 21 and the first S-shaped bent optical waveguide 22 form a first-stage coupling structure. The second coupling optical waveguide 24 and the second S-shaped bent optical waveguide 25 form a second coupling structure. There are a plurality of subsequent coupling structures which are the same as the first-stage coupling structure and the second-stage coupling structure, and the subsequent coupling structures are not described in detail. The first transmission optical waveguide 23 and the second transmission optical waveguide 26 are optical waveguides for transmitting superimposed mode power.

The core heights h of the first optical waveguide and the second optical waveguide are the same, but the widths $w_1$ and $w_2$ are different, and the relationship that $w_1$ is more than $w_2$ is met. The effective refractive indexes of the middle modes of the optical waveguide 1 and the optical waveguide 2 are equal by controlling the values of $w_1$ and $w_2$. The effective coupling distance between the first coupling optical waveguide 21, the second coupling optical waveguide 24 and the first optical waveguide 1 is $D_1$, and the coupling efficiency is improved as much as possible by controlling the value of $D_1$, so that the mode power of each coupling is maximized to realize high-efficiency coupling.

When optical waves are propagated in the first optical waveguide 1, after the optical waves pass through the first coupling distance $L_1$, part of the power of the $E_{31}^x$ mode in the first optical waveguide 1 is coupled into the $E_{11}^x$ mode in the first coupling optical waveguide 21. The remaining power of the $E_{31}^x$ mode in the first optical waveguide 1 continues to be propagated in the first optical waveguide 1. When the optical waves pass through the second coupling distance $L_2$, the remaining power of the $E_{31}^x$ mode in the first optical waveguide 1 continues to be coupled into the $E_{11}^x$ mode in the second coupling optical waveguide 24 to the maximum extent. The coupling distance $L_1$, and the coupling distance $L_2$ are obtained so that the power of the two modes obtained after two times of coupling is equal. The power after two times of coupling is superimposed in the straight optical waveguide for transmission and output at the output end of the second optical waveguide 2. By introducing the coupling structures, the mode power in all coupling structures is superimposed, so that the coupling efficiency between the optical waveguides is improved, and the module division multiplexing function is realized.

Embodiment I

Figure 2:
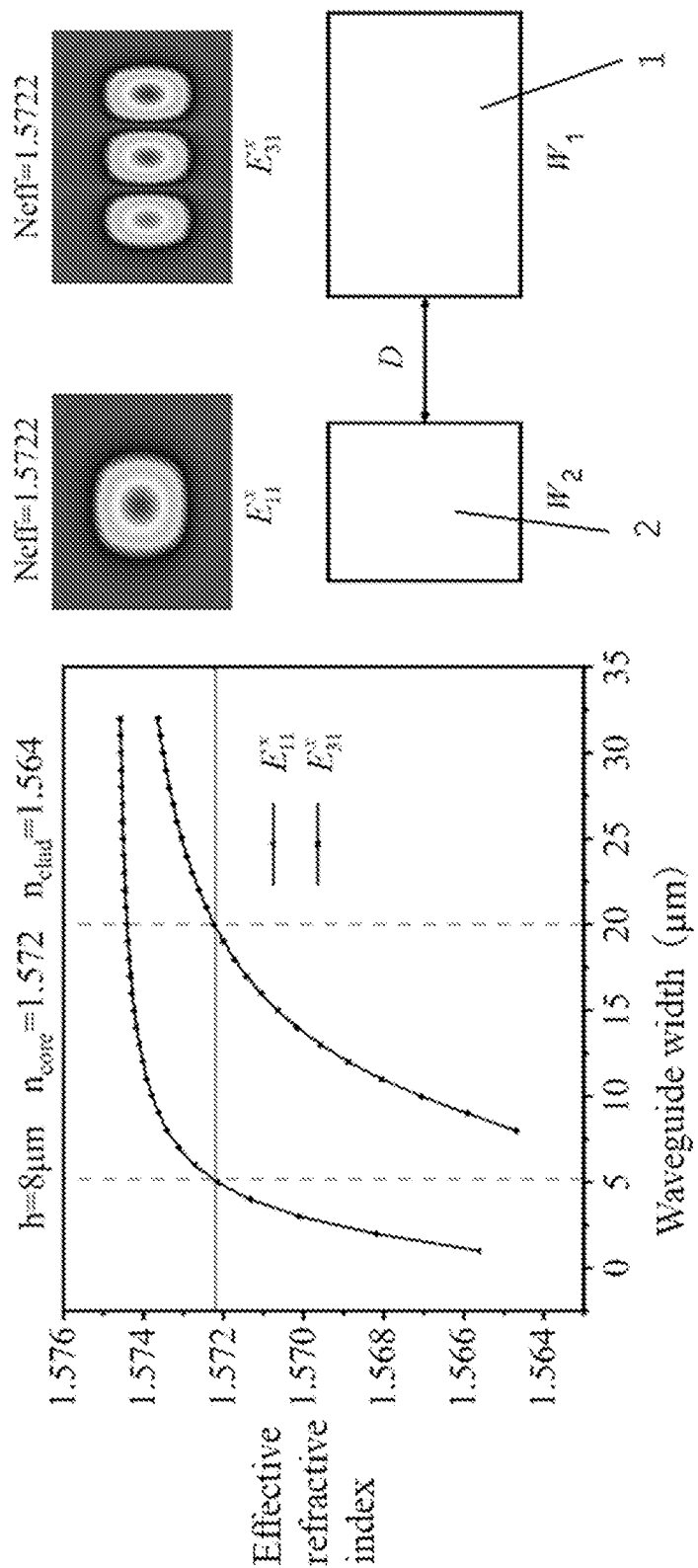
FIG. 2 is a phase matching condition and corresponding mode pattern of optical waveguide modes.

In the actual preparation process, the heights of the first optical waveguide and the second optical waveguide are kept the same. The changes in the relationship between the effective refractive index of the optical waveguide mode and the width of the optical waveguide are researched. The effective refractive indexes of the two modes are gradually increased along with the increase of the waveguide width, and a specific constant value is finally approached. The heights of the two selected optical waveguides are selected to be fixed at 81 μm according to actual needs. According to the needed phase matching conditions that mode coupling can occur (the effective refractive indexes of the modes are equal), the core widths $w_1$ and $w_2$ of the first optical waveguide and the second optical waveguide are selected to be 20 μm and 5.2 μm, respectively. At this time, the effective refractive indexes of the $E_{31}^x$ mode and $E_{11}^x$ mode are both 1.5722, so the widths are reasonable, the coupling efficiency is good, and the coupling power is high. As shown in FIG. 2, the left figure is a curve graph of the waveguide width and the effective refractive index of the optical waveguide mode, and the right figure is a schematic diagram of the optical waveguide mode that can be coupled under the same mode effective refractive index and the optical waveguide core width.

Embodiment II

The width of the first optical waveguide is controlled to be 20 μm, the width of the second optical waveguide is controlled to be 5.2 μm, and the heights of the first optical waveguide and the second optical waveguide are both controlled to be 8 μm. In the two groups of coupling simulation (which are both first-stage coupling structures) with the mode effective refractive index of 1.5722, the influence of the interval between the optical waveguides on the coupling efficiency is researched.

Figure 3:
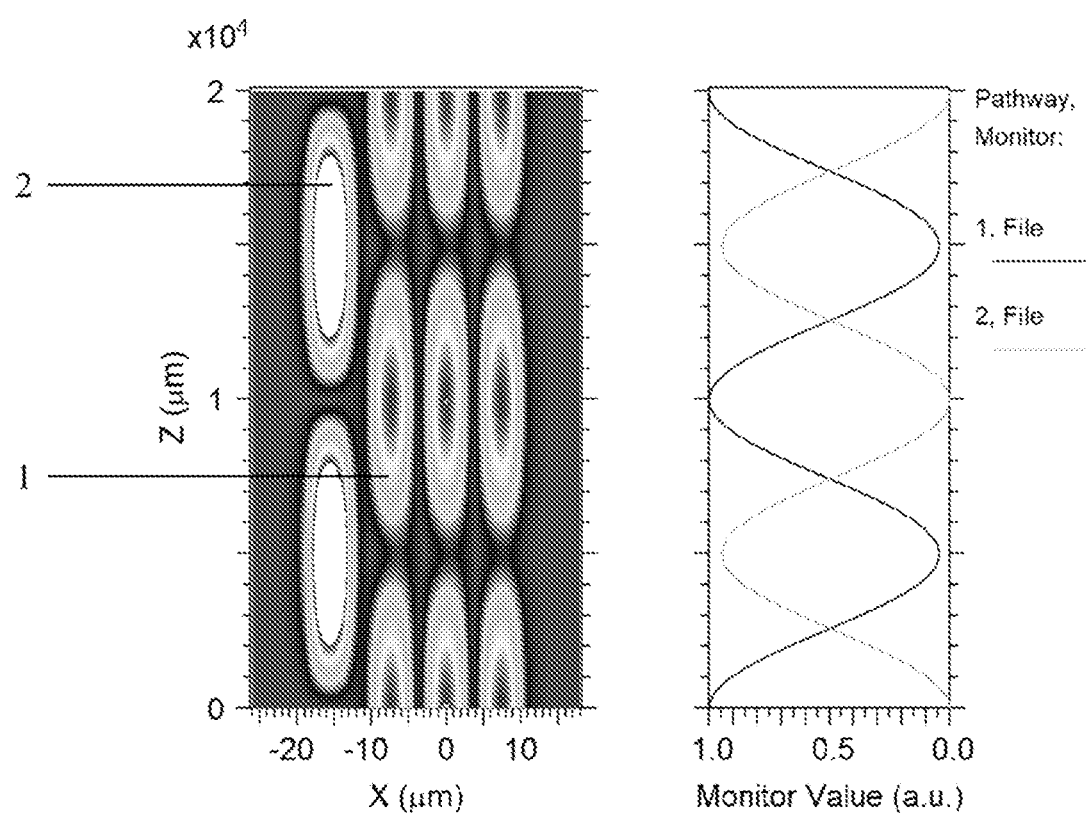
FIG. 3 is a coupling efficiency diagram of the $E_{31}^x$ mode in the optical waveguide 1 and the mode in the optical waveguide 2 when the interval between the optical waveguides is 3 μm.

In the first group, the interval between the first optical waveguide and the coupling optical waveguide is 3 μm, and the maximum coupling efficiency between the first optical waveguide and the second optical waveguide is 93% and the coupling length is about 4813 μm through simulation, as shown in FIG. 3.

Figure 4:
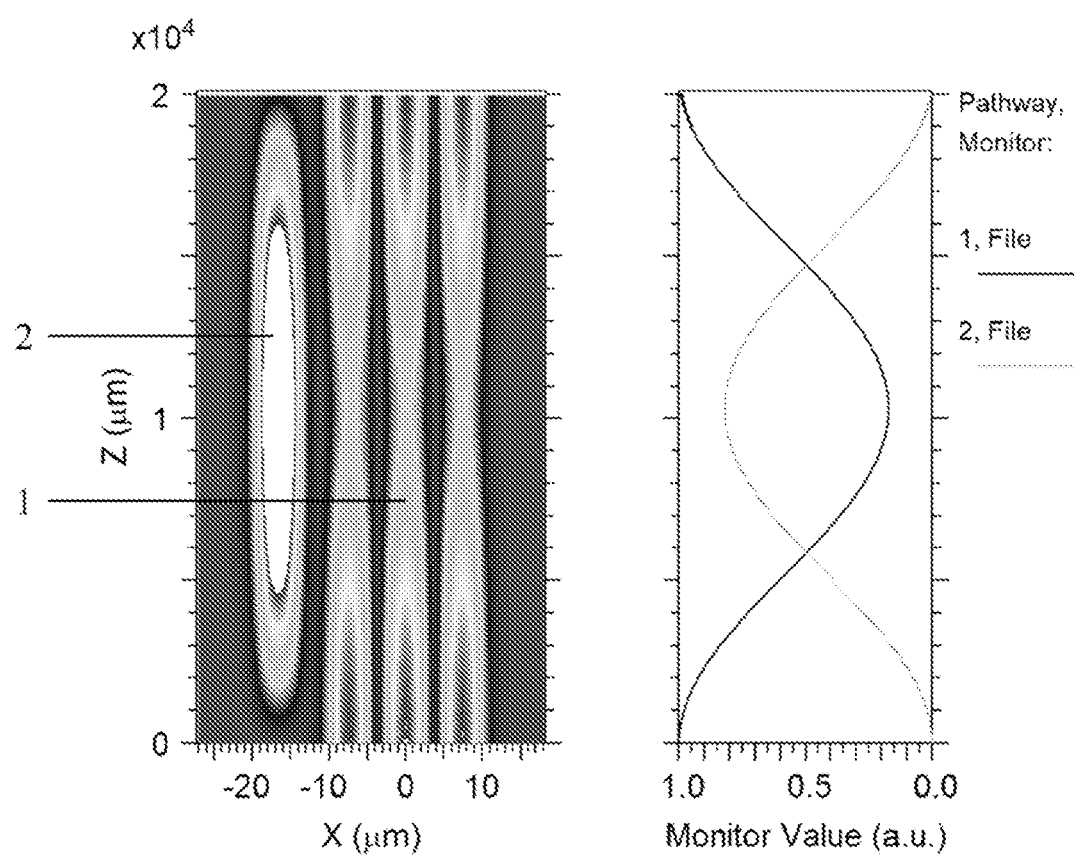
FIG. 4 is a coupling efficiency diagram of the $E_{31}^x$ mode in the optical waveguide 1 and the mode in the optical waveguide 2 when the interval between the optical waveguides is increased to 4 μm.

In the second group, the interval between the first optical waveguide and the coupling optical waveguide is 4 μm, and the maximum coupling efficiency between the first optical waveguide and the second optical waveguide is 82.2% and the coupling length is about 10120 μm through simulation, as shown in FIG. 4.

In the third group, the interval between the first optical waveguide and the coupling optical waveguide is 8 μm, and the maximum coupling efficiency between the first optical waveguide and the second optical waveguide is 0 through simulation.

Through the comparison of the above-mentioned three groups of simulation, it is found that the smaller the interval between the optical waveguides is, the higher the coupling efficiency is and the shorter the coupling length is. When the interval is more than 8 μm, the first optical waveguide and the coupling optical waveguide cannot be coupled, and the efficiency is the maximum when the interval is 3 μm, but the interval of 3 μm is difficult to prepare and cannot be realized in reality. Finally, it is concluded that the coupling efficiency is the optimal in reality when the interval is 4 μm.

In the embodiment, an optical waveguide directional coupled mode division multiplexer is analyzed, and the influence of the interval between the first optical waveguide and the coupling optical waveguide on the coupling efficiency is researched. The results show that the mode coupling effect is the optimal and the coupling efficiency is the highest when the interval is 3 μm. However, the interval of 3 μm is difficult to prepare and cannot be realized in reality. The final conclusion is that the coupling efficiency is the optimal in reality when the interval is 4 μm. Under the condition that the interval of transmission optical waveguides is kept constant, the efficient coupling efficiency can be realized by adding the multiple coupling structures and superposing the power of each coupling structure, and then the optical information transmission capacity is expanded.

Embodiment III

Figure 5:
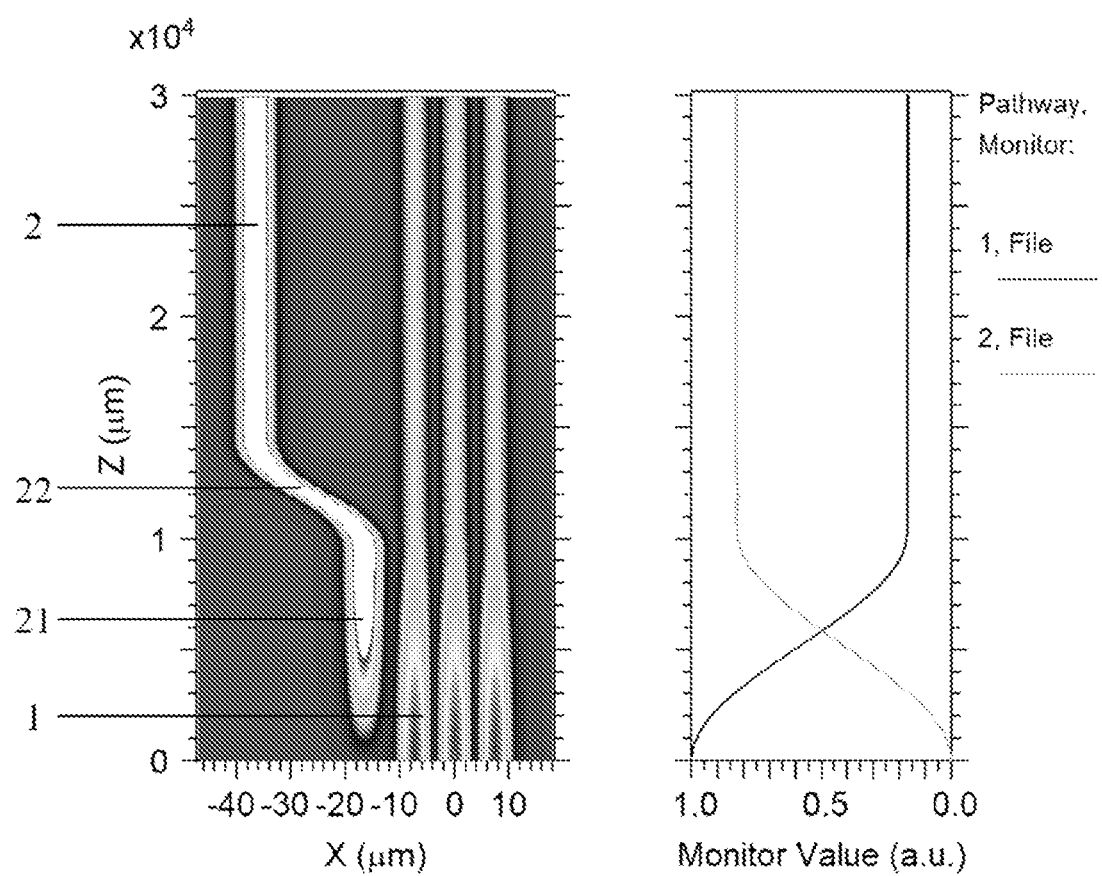
FIG. 5 is a power propagation diagram of the mode in each optical waveguide at the mode in the optical waveguide 1 excited by a first-stage coupling structure.
Figure 6:
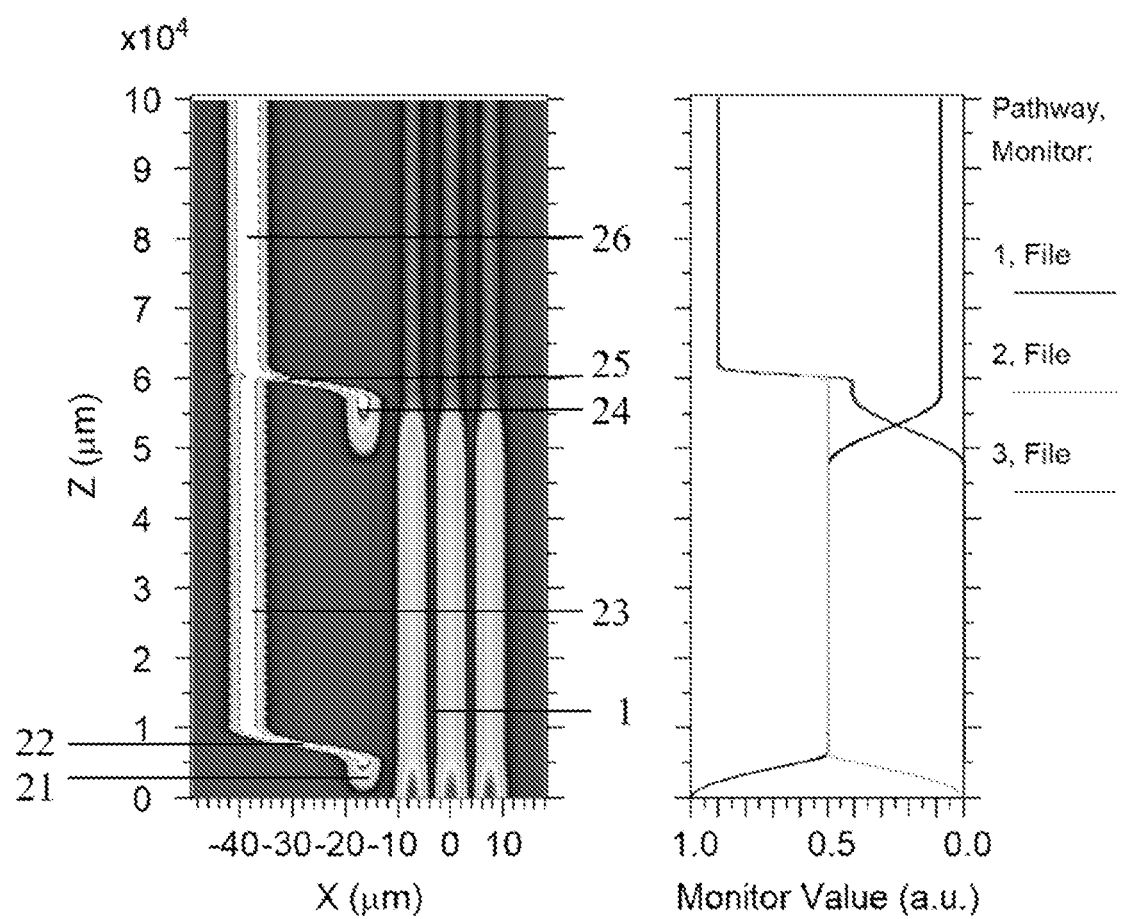
FIG. 6 is a power propagation diagram of the mode in each optical waveguide at the mode in the optical waveguide 1 excited by a second-stage coupling structure.
Figure 7:
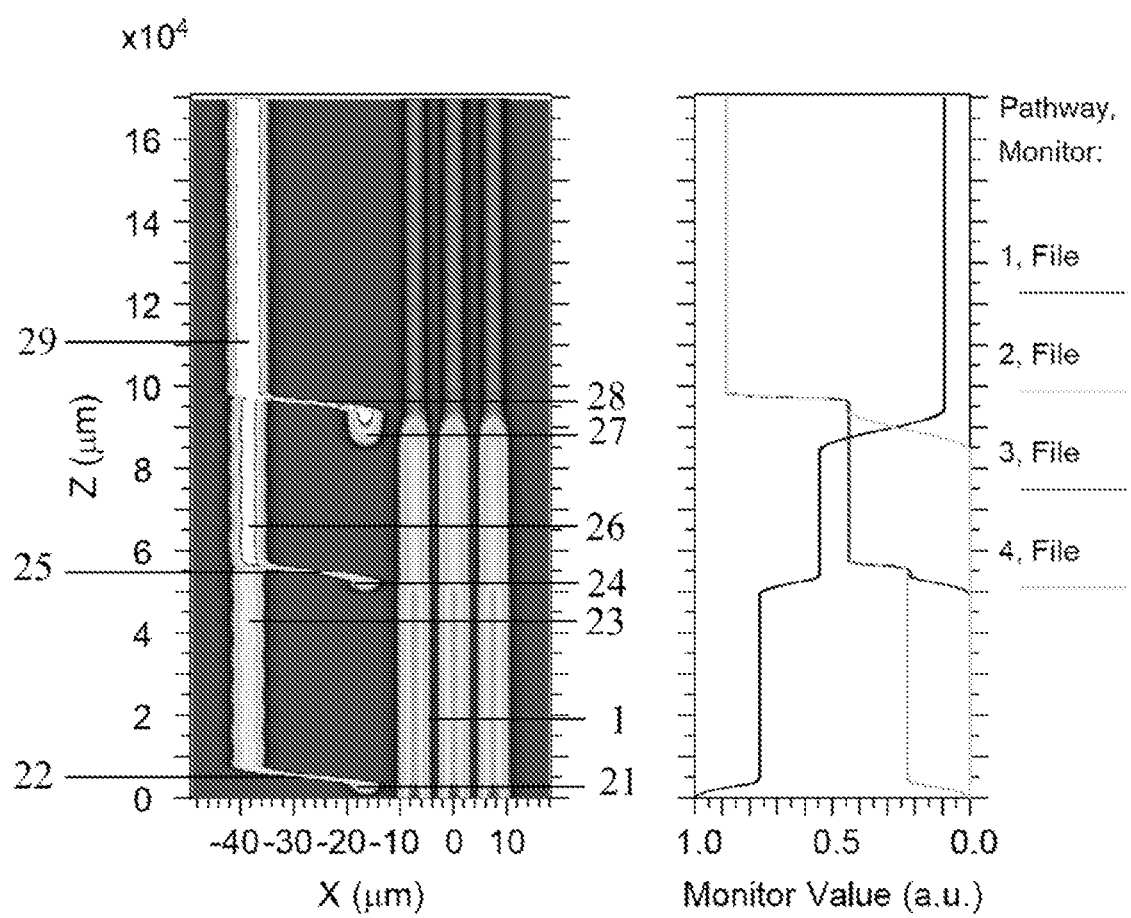
FIG. 7 is a power propagation diagram of the mode in each optical waveguide at the mode in the optical waveguide 1 excited by a third-stage coupling structure.

Based on the above-mentioned embodiments, in the embodiment, coupling simulation is carried out on the different numbers of coupling structures, and the coupling efficiency is tested, as shown in FIG. 5, FIG. 6 and FIG. 7. The specific details are as follows.

In the three groups of simulation, the width of the first optical waveguide is 20 μm, the width of the second optical waveguide is 5.2 μm, and the heights of the first optical waveguide and the second optical waveguide are both 8 μm. In the two groups (which are both first-stage coupling structures) with the mode effective refractive index of 1.5722, the interval between the first optical waveguide and the coupling optical waveguide is 4 μm.

In the first group, FIG. 5 shows the result of first-stage coupling simulation. After the S-shaped bent waveguide is transmitted, the final mode coupling efficiency is 82.2% with little loss. The transverse width of the S-shaped bent waveguide is 22 and the longitudinal length of the S-shaped bent waveguide is 5000 μm.

In the second group, FIG. 6 shows the result of second-stage coupling simulation. The first coupling optical waveguide 21 and the first S-shaped bent optical waveguide 22 form the first-stage coupling structure. The second coupling optical waveguide 24 and the second S-shaped bent optical waveguide 25 form the second-stage coupling structure. Firstly, first-stage coupling is carried out on the $E_{31}^x$ mode in the first optical waveguide 1 and the $E_{11}^x$ mode in the first coupling optical waveguide 21. In order to make the power of the two modes superimposed after coupling nearly equal, the coupling length $L_1$ of the first-stage coupling is set to be 4813 and the power of the mode remaining in the first optical waveguide 1 continues to be transmitted forward. In the second-stage coupling, the remaining power of the $E_{31}^x$ mode in the first optical waveguide 1 is coupled to the Eh mode in the second coupling optical waveguide 24 to the maximum extent as much as possible. Therefore, the coupling length $L_2$ is 10120 After calculation, the second-stage coupling with the second coupling optical waveguide 24 starts when z is 47500 The phase difference between the two Eh modes at the superposed position of the first-stage coupling and the second-stage coupling is close to zero, so the maximum coupling efficiency under the condition can be obtained after the superposition of two optical waves. The final coupling efficiency of two-stage coupling is 90.5% and is greater than 82.2% which is the coupling efficiency of one-stage coupling. Therefore, the coupling efficiency between the two optical waveguide modes can be improved and the mode division multiplexing function can be realized through multi-cascaded coupling under the condition of large optical waveguide interval.

In the third group, FIG. 7 shows the result of third-stage coupling simulation. The first coupling optical waveguide 21 and the first S-shaped bent optical waveguide 22 form the first-stage coupling structure. The second coupling optical waveguide 24 and the second S-shaped bent optical waveguide 25 form the second-stage coupling structure. The third coupling optical waveguide 27 and the third S-shaped bent optical waveguide 28 form the third-stage coupling structure. Firstly, the $E_{31}^x$ mode in the first optical waveguide 1 is couple with the $E_{11}^{mode}$ in the first coupling optical waveguide 21, and the first-stage coupling length $L_1$ is 2800 The power of the two optical wave modes superimposed after coupling is equal. Then, second-stage coupling is carried out on the $E_{31}^{mode}$ in the first optical waveguide 1 and the $E_{11}^{mode}$ in the second coupling optical waveguide 24 when z is 49124 and the coupling length $L_2$ is 3300 The power of the two light wave modes superimposed after coupling is equal. When z is 84117 third-stage coupling is carried out on the $E_{31}^x$ mode in the first optical waveguide 1 and the Eh mode in the third coupling optical waveguide 27, and the coupling length $L_3$ is 9500 The final coupling efficiency of the third-stage coupling is 90.4%, and is close to 90.5% of the coupling efficiency of second-stage coupling structure and higher than 82.2% which is the coupling efficiency of first-stage coupling structure. Therefore, the mode coupling efficiency between two optical waveguides can be improved and the mode division multiplexing function can be realized through multi-cascaded coupling when the optical waveguide interval is increased. However, the more coupling structures are, the better is. It is most important to select an appropriate multi-cascaded coupling structure according to the appropriate scene.

Through simulation comparison, it is found that the coupling efficiency of three coupling structures is equal to that of two coupling structures, and the coupling efficiency of three coupling structures and the coupling efficiency of two coupling structures are larger than that of one coupling structure. Therefore, it can be seen that the coupling efficiency between two optical waveguides can be improved by adding the coupling structures when the interval between optical waveguides is increased.

In the embodiment, the coupling efficiency testing is carried out on the mode division multiplexers with one coupling structure, two coupling structures and three coupling structures, respectively. It can be obtained from the comparison of simulation data that the coupling efficiency can be improved by using the coupling structures, and the coupling efficiency is improved along with the increase of the number of coupling structures. The mode division multiplexers with multi-cascaded coupling structures can be realized without increasing the difficulty of optical waveguide preparation process, and the coupling efficiency between optical waveguides is improved, so that the optical information transmission capacity is further increased.

In a word, the multi-cascaded coupling structure provided by the present disclosure can realize higher mode coupling efficiency and the mode division multiplexing function through multiple couplings and mode power superposition under the condition of relatively large optical waveguide interval. The detailed description of the present disclosure cannot summarize all the contents of the present disclosure, so the patent scope of the present disclosure cannot be limited. Any modifications made with reference to the ideas and principles of the present disclosure should be within the scope of protection of the present disclosure.

What is claimed is:

1. An optical waveguide multi-cascaded coupling mode division multiplexer, comprising an optical waveguide layer, wherein the optical waveguide layer comprises a first optical waveguide and a second optical waveguide;
   the second optical waveguide comprises a transmission optical waveguide and a plurality of coupling structures;
   each coupling structure comprises a coupling optical waveguide and a connecting optical waveguide;
   the coupling optical waveguide and the transmission optical waveguide are connected through the connecting optical waveguide, wherein one end of the connecting optical waveguide is connected to one end of the coupling optical waveguide and another end of connecting optical waveguide is connected to one end of the transmission optical waveguide, another end of the transmission optical waveguide is connected to a side surface of another adjacent connecting optical waveguide, and another end of the coupling optical waveguide is a free end;

the coupling optical waveguide is parallel to the transmission optical waveguide; the lengths of the coupling optical waveguides in the coupling structures are obtained so that the power of the two superimposed optical waves is equal, and the phases of the modes in the waveguides of any two superimposed coupling structures are equal at the superposition position, such that the phase difference is 0, so that the maximum power of the optical waves after coupling and superposition is ensured;

the distance between the coupling optical waveguide and the first optical waveguide is smaller than that between the transmission optical waveguide and the first optical waveguide; and when optical waves are propagated in the first optical waveguide, the coupling structures in the second optical waveguide are used for sequentially coupling the mode power of the first optical waveguide, the sequentially coupled mode power is superposed, and the coupled and superposed power is output at the output end.

2. The optical waveguide multi-cascaded coupling mode division multiplexer according to claim 1, wherein the connecting optical waveguide is an S-shaped bent optical waveguide.

3. The optical waveguide multi-cascaded coupling mode division multiplexer according to claim 1, wherein the heights of the first optical waveguide and the second optical waveguide are equal, and the widths of the first optical waveguide and the second optical waveguide are adjusted to ensure that the effective refractive index of the high-order mode in the first optical waveguide is equal to that of the fundamental mode in the second optical waveguide.

4. The optical waveguide multi-cascaded coupling mode division multiplexer according to claim 3, wherein the coupling structures comprise three coupling structures.

5. The optical waveguide multi-cascaded coupling mode division multiplexer according to claim 1, wherein the distance between the transmission optical waveguide and the first optical waveguide is larger than the maximum effective coupling distance.

6. The optical waveguide multi-cascaded coupling mode division multiplexer according to claim 1, wherein the distance between the coupling optical waveguide and the first optical waveguide is 4 µm.

7. The optical waveguide multi-cascaded coupling mode division multiplexer according to claim 1, further comprising a substrate layer, wherein the substrate layer is taken as a substrate for placing and fixing the first optical waveguide and the second optical waveguide.

8. The optical waveguide multi-cascaded coupling mode division multiplexer according to claim 7, wherein the optical waveguide layer is made of polymer photoresist, and the substrate layer is made of an FR-4 epoxy plate.

9. An optical waveguide communication system, comprising the optical waveguide multi-cascaded coupling mode division multiplexer according to claim 1.

10. The optical waveguide communication system according to claim 9, wherein the connecting optical waveguide is an S-shaped bent optical waveguide.

11. The optical waveguide communication system according to claim 9, wherein the heights of the first optical waveguide and the second optical waveguide are equal, and the widths of the first optical waveguide and the second optical waveguide are adjusted to ensure that the effective refractive index of the high-order mode in the first optical waveguide is equal to that of the fundamental mode in the second optical waveguide.

12. The optical waveguide communication system according to claim 11, wherein the coupling structures comprise three coupling structures.

13. The optical waveguide communication system according to claim 9, wherein the distance between the transmission optical waveguide and the first optical waveguide is larger than the maximum effective coupling distance.

14. The optical waveguide communication system according to claim 9, wherein the distance between the coupling optical waveguide and the first optical waveguide is 4 µm.

15. The optical waveguide communication system according to claim 9, further comprising a substrate layer, wherein the substrate layer is taken as a substrate for placing and fixing the first optical waveguide and the second optical waveguide.

16. The optical waveguide communication system according to claim 15, wherein the optical waveguide layer is made of polymer photoresist, and the substrate layer is made of an FR-4 epoxy plate.

* * * * *